UNITED STATES PATENT OFFICE.

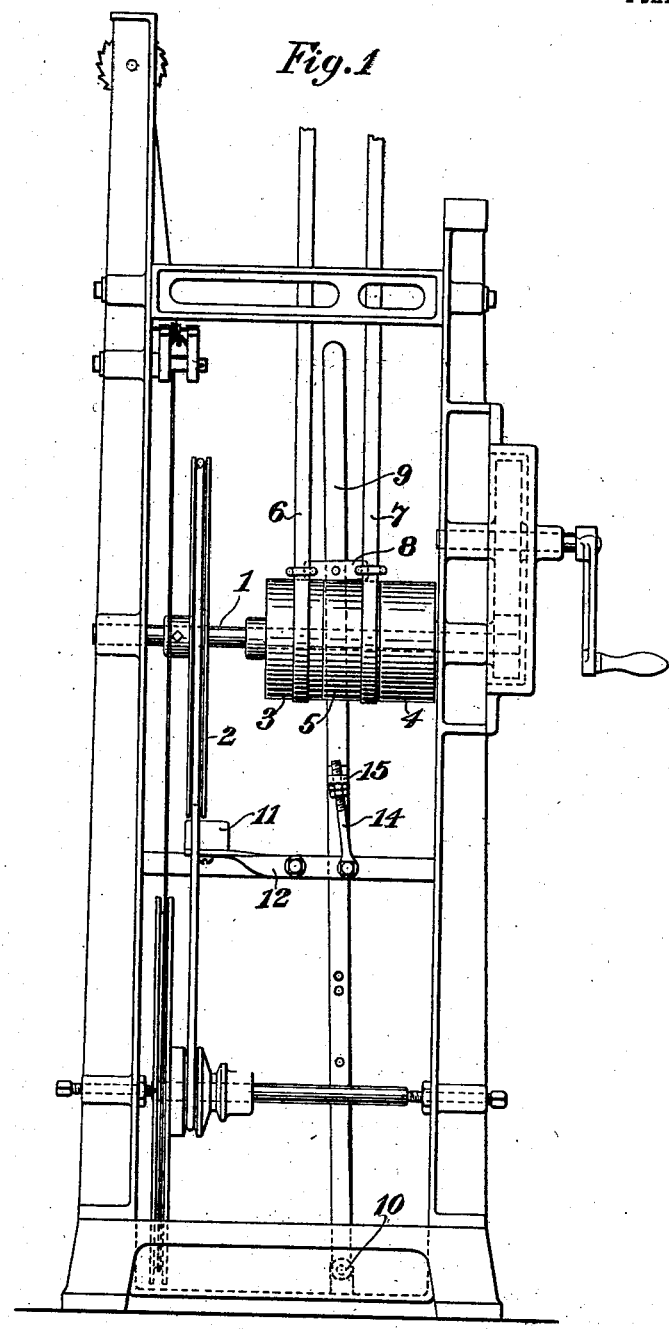

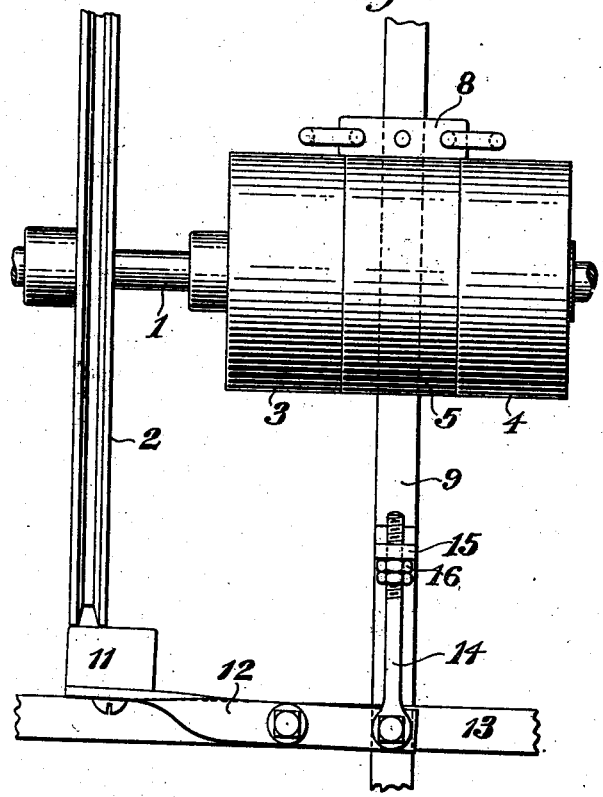
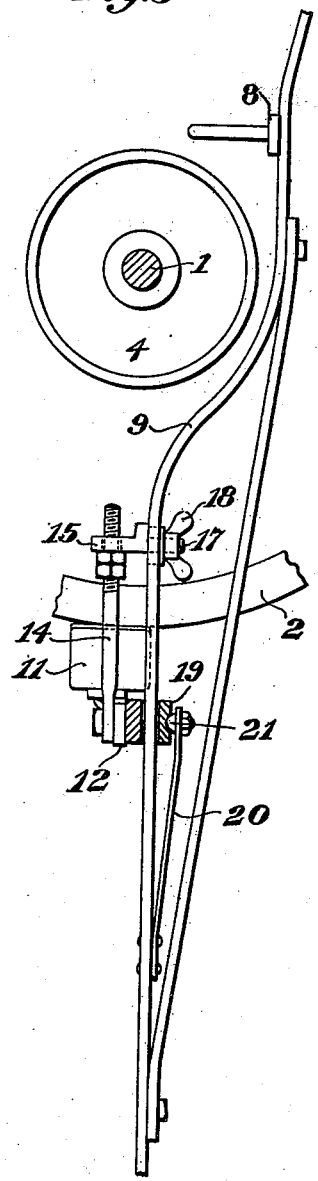
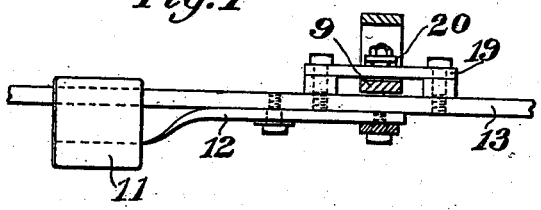

CHARLES WIEBKE, OF NEW YORK, N. Y.

GEARING.

No. 899,277.  Specification of Letters Patent.  Patented Sept. 22, 1908.

Application filed June 25, 1907. Serial No. 380,657.

*To all whom it may concern:*

Be it known that I, CHARLES WIEBKE, a citizen of the United States, residing at the borough of the Bronx, New York city, in the county of New York and State of New York, have invented a certain new and useful Improvement in Gearings, of which the following is a specification, reference being had therein to the accompanying drawings, forming a part thereof.

My invention relates particularly to a brake mechanism for use in connection with means for driving a pulley or other rotary part of a machine in alternating directions, and the object of the invention is to produce a mechanism of this character which will operate to bring such rotary member quickly to rest during the short interval between the cessation of driving in one direction and the application of power to drive in the opposite direction, so that the strain which would otherwise occur to the belt or other driving mechanism when suddenly connected with a member rotating at high speed in the wrong direction is avoided, and the time required to reverse the direction of rotation is reduced.

Other objects of the invention relate to minor improvements which will be noted in connection with the description of the illustrated embodiment of the invention.

The invention comprises, in its broadest aspect, the combination with a rotary member and means to rotate it in either direction of a lever to reverse the direction of operation of said means, and a brake applicable to the rotary member and so connected with the reversing lever as to be applied when the lever occupies its neutral position in changing the direction of rotation of the mechanism, while at either extreme position of the lever, in which the power is applied to rotate the rotary member in one direction or the other, the brake is moved out of operation.

The invention also comprises certain details of construction by which the operation of the brake is rendered very powerful, and by which the mechanism may be adjusted, thrown permanently out of operation, or retained in operative position.

I will now describe the embodiment of my invention illustrated in the accompanying drawings, and will then point out my invention in claims.

In the drawings Figure 1 is a rear elevation of a spin-wheel machine in which the present invention is embodied. Fig. 2 is a rear elevation of the brake mechanism alone. Fig. 3 is a side elevation of the brake mechanism. Fig. 4 is a horizontal sectional view of the brake mechanism.

The invention is illustrated as embodied in a spin-wheel machine, of which the general construction is well known and need not be described.

The machine is provided in the usual manner with a drive shaft 1 carrying a driving pulley 2 which rotates at high speed when the machine is in operation. Loose pulleys 3 and 4 are journaled on the shaft, and between them is a fixed pulley 5. Belts 6 and 7 connect the machine with a source of power and run constantly in opposite directions. A belt shipper 8, engaging the belts 6 and 7, is mounted on a manually-operable shipper lever 9 which is pivoted at 10 to the frame of the machine. When the shipper lever is in its median position the belts run on the two loose pulleys and the machine is idle, but when the shipper is moved from its median position one belt or the other is shifted to the fast pulley 5 so as to drive the shaft and the pulley 2.

The brake consists of a block 11 of wood or other suitable material which is mounted on a lever 12 in position to engage the rim of the pulley 2 when raised by the lever. The lever is pivoted on a cross-bar 13 on the frame of the machine, and a link 14, pivoted to the end of the lever, passes loosely through a hole in a lug 15 mounted on the shipper lever 9, while adjustable nuts 16 on the link engage the bottom of the lug.

The lever 12 is so placed that its end is substantially in line with the shipper lever when the latter is in its median position, and thus the link 14 and the shipper lever constitute a toggle joint, of which the link 14 forms one member or link, while a portion of the shipper lever constitutes the other member or link, and therefore they have a toggle action on the brake lever at this time, so as to force down the inner end of the brake lever and apply the brake to the pulley 2. This effect is very powerful and may be adjusted by means of the nuts 16 to secure the desired pressure of the brake against the pulley. In any position of the shipper lever except the median position the brake is removed and the pulley is free to rotate. Owing to this arrangement the brake is applied momentarily in moving the shipper lever to reverse the machine and is automatically released as soon as one of the belts has been brought to the fast pulley. As it is sometimes desirable to operate the machine by hand by gearing supplied in such machine for this purpose, provision is made for releasing the brake while the shipper is in median position and the belts are on the loose pulleys. The lug 15 is not fast to the shipper lever, but is fixed by a stem 17 passing through an elongated opening in the lever and provided with a thumb-nut 18. When the thumb-nut is loosened the lug may be raised so as to release the link 14 from pressure against the nuts 16, and thus the brake is released.

To secure the belt-shipper in median position against accidental displacement the shipper lever is provided with a spring 20 carrying a rounded detent 21 which slides on a bar 19 fixed to the bar 13, and resiliently engages a notch in the bar 19 when the lever is in median position.

The invention is applicable to machines of any character in which it is desirable to effect a quick reversal in the direction of rotation of a pulley or other rotating member, and in its broadest aspects it is not limited to a mechanism in which belts and pulleys are used to rotate such member in opposite directions.

It is obvious that various modifications may be made in the construction shown and above particularly described within the principle and scope of my invention.

I claim:—

1. A gearing comprising a rotary member, means for rotating it in opposite directions, a reversing member connected with said means and operating, when in either of two extreme positions, to throw said means into operation, and, when in median position, to throw said means out of operation, a brake arranged to engage the rotary member, and connections between the brake and the reversing member, said connections being carried by the reversing member and constructed and operating to throw the brake into operation at the median position of said member, such connections having provision for adjusting the brake and independent provision for releasing the brake without changing the adjustment of the brake or moving the reversing member from median position.

2. A gearing comprising a rotary member, belts for rotating said member in opposite directions, a belt shipper controlling the belts, a lever on which the shipper is mounted, a brake arranged to engage the rotary member, a lever on which the brake is mounted, and a toggle link having adjustable connection with the brake lever and the shipper lever and coöperative with the shipper lever, the latter forming the other link of a toggle joint, acting in the manner of a toggle to apply the brake when the shipper lever is in median position.

3. A brake mechanism comprising a rotary member, means for rotating it in opposite directions, a reversing member operating when moved to reverse the direction of rotation of the rotary member, a brake arranged to engage the rotary member, and adjustable connections between the brake and reversing member carried by the reversing member and constructed and operating to apply the brake during movements of the reversing members and to release the brake when such movement is completed.

In testimony whereof I have affixed my signature in presence of two witnesses.

CHARLES WIEBKE.

Witnesses:
HENRY D. WILLIAMS,
BERNARD COWEN.